US008227087B2

(12) United States Patent
Mayuzumi et al.

(10) Patent No.: US 8,227,087 B2
(45) Date of Patent: Jul. 24, 2012

(54) CHARGING MEMBER, PROCESS CARTRIDGE, AND ELECTROPHOTOGRAPHIC APPARATUS

(75) Inventors: Hiroshi Mayuzumi, Yokohama (JP); Noriaki Kuroda, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/309,525

(22) Filed: Dec. 1, 2011

(65) Prior Publication Data

US 2012/0076924 A1 Mar. 29, 2012

Related U.S. Application Data

(62) Division of application No. 12/279,972, filed as application No. PCT/JP2007/053983 on Feb. 23, 2007.

(30) Foreign Application Priority Data

Feb. 28, 2006 (JP) ................................ 2006-052849

(51) Int. Cl.
*B32B 9/04* (2006.01)

(52) U.S. Cl. ......................................... 428/447; 427/58

(58) Field of Classification Search .................. 428/447
See application file for complete search history.

(56) References Cited

U.S. PATENT DOCUMENTS 5,581,329 A 12/1996 Kosmider et al.

(Continued)

FOREIGN PATENT DOCUMENTS

EP 0 982 335 A1 3/2000

(Continued)

OTHER PUBLICATIONS

European Official Action dated Aug. 3, 2011 in European Application No. 07 715 133.0.

*Primary Examiner* — Doris Lee

(74) *Attorney, Agent, or Firm* — Fitzpatrick, Cella, Harper & Scinto

(57) ABSTRACT

A charging member is provided having a support, a conductive elastic layer formed on the support and a surface layer formed on the conductive elastic layer. The surface layer contains a polysiloxane having at least one of structures represented by the following formulas (1a1), (1a2), (1b1) and (1b2):

(1a1)

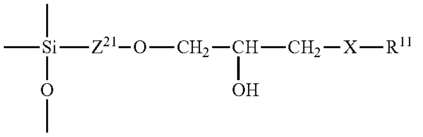

(1a2)

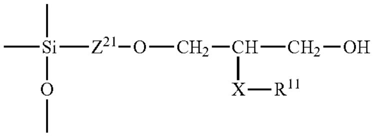

(1b1)

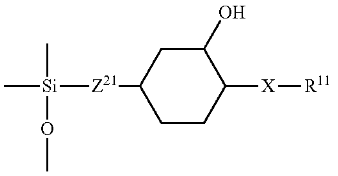

(1b2)

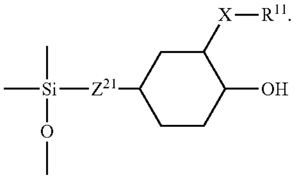

Toners and external additives used in the toners clinging to the charging member surface can be minimized even through repeated use over a long period of time, thus the charging member can perform stable charging and image reproduction even when used in the DC contact charging method.

2 Claims, 1 Drawing Sheet

U.S. PATENT DOCUMENTS

| | | | | |
|---|---|---|---|---|
| 2006/0029428 | A1 | 2/2006 | Taniguchi et al. | |
| 2009/0238601 | A1 * | 9/2009 | Kuroda et al. | 399/111 |

FOREIGN PATENT DOCUMENTS

| | | | |
|---|---|---|---|
| EP | 1 624 347 | A2 | 2/2006 |
| JP | 2001-173641 | | 6/2001 |
| JP | 2003-076116 | | 3/2003 |
| JP | 2004-210857 | | 7/2004 |

* cited by examiner

CHARGING MEMBER, PROCESS CARTRIDGE, AND ELECTROPHOTOGRAPHIC APPARATUS

This application is a divisional of application Ser. No. 12/279,972, which was the National Stage of International Application No. PCT/JP2007/053983, filed Feb. 23, 2007. The contents of each of the foregoing applications is incorporated herein by reference.

TECHNICAL FIELD

This invention relates to a charging member, and a process cartridge and an electrophotographic apparatus which have the charging member.

BACKGROUND ART

At present, a contact charging method has been put into practical use as one of methods for charging the surface of an electrophotographic photosensitive member electrostatically.

The contact charging method is a method in which a voltage is applied to a charging member disposed in contact with the electrophotographic photosensitive member, to cause micro-discharge at the contact part between the charging member and the electrophotographic photosensitive member and the vicinity thereof to charge the surface of the electrophotographic photosensitive member electrostatically.

As the charging member for charging the surface of the electrophotographic photosensitive member, from the viewpoint of sufficiently ensuring a contact nip between the electrophotographic photosensitive member and the charging member, one having a support and an elastic layer (conductive elastic layer) provided on the support is commonly used.

The elastic layer (conductive elastic layer) often contains low-molecular weight components in a relatively large quantity, and hence such low-molecular weight components may ooze to contaminate the surface of the electrophotographic photosensitive member. In order to suppress this contamination due to the oozing, it is also prevalent to provide on the conductive elastic layer a surface layer having a lower modulus of elasticity than the conductive elastic layer.

As the shape of the charging member, a roller shape is commonly employed. Hereinafter, the roller-shaped charging member is referred to also a "charging roller".

The contact charging method in widespread use is a method in which a voltage generated by superimposing an alternating-current voltage on a direct-current voltage is applied to the charging member (hereinafter referred to also as "AC+DC contact charging method"). In the case of the AC+DC contact charging method, a voltage having a peak-to-peak voltage twice or more as high as the voltage at which the charging is started is used as the alternating-current voltage.

The AC+DC contact charging method is a method by which stable charging high in charging uniformity can be performed because of the use of the alternating-current voltage. However, insofar as an alternating-current voltage source is used, this method brings about a charging assembly and an electrophotographic apparatus which are large in size and a rise in cost, as compared with a method in which only a direct-current voltage is applied to the charging member (hereinafter referred to also as "DC contact charging method").

That is, the DC contact charging method is superior to the AC+DC contact charging method in miniaturizing the charging assembly and electrophotographic apparatus and reducing costs.

As a conductive member used in an electrophotographic apparatus, such as the charging member, a conductive member having an inorganic-organic hybrid film having an organosilicon compound is proposed (see, e.g., Japanese Patent Application Laid-open Nos. 2001-173641 and 2004-210857).

DISCLOSURE OF THE INVENTION

However, the DC contact charging method has no effect of improving charge uniformity which is due to alternating-current voltage. Hence, surface contamination (due to toners and external additives used in the toners) of the charging member and electrical resistance non-uniformity of the charging member itself tend to appear on reproduced images.

Especially in the case of the DC contact charging method, toners and external additives used in the toners adhere (cling) non-uniformly and strongly to the surface of the charging member through repeated use. As a result, the part to which they have clung may cause supercharging or faulty charging when halftone images are reproduced in a high-temperature and high-humidity environment (30° C./80% RH).

An object of the present invention is to provide a charging member the surface of which toners and external additives used in the toners cannot easily cling to even through repeated use over a long period of time and which therefore can perform stable charging and image reproduction over a long period of time, even when used in the DC contact charging method. A further object of the present invention is to provide a process cartridge and an electrophotographic apparatus which have such a charging member.

The present invention is a charging member having a support, a conductive elastic layer formed on the support and a surface layer formed on the conductive elastic layer, wherein the surface layer contains a polysiloxane having at least one structure selected from the group consisting of a structure represented by the following formula (1a1), a structure represented by the following formula (1a2), a structure represented by the following formula (1b1) and a structure represented by the following formula (1b2).

(1a1)

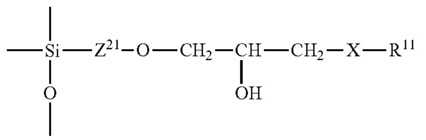

(1a2)

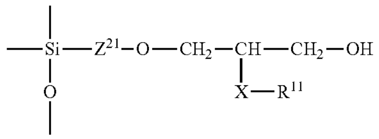

(1b1)

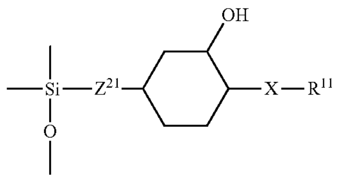

-continued (1b2)

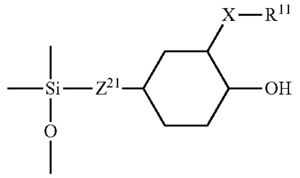

In the formulas (1a1), (1a2), (1b1) and (1b2), X represents one functional group selected from the group consisting of —O—, —$NR^{12}$— and —COO—; $R^{11}$ represents a hydrocarbon group; $R^{12}$ represents a hydrogen atom or a hydrocarbon group; and $Z^{21}$ represents a divalent organic group.

The present invention is also a process cartridge and an electrophotographic apparatus which have the above charging member.

According to the present invention, a charging member is provided in which the fixing of toners and external additives used in the toners to its surface is minimized even through repeated use over a long period of time and which therefore can perform constant charging and image reproduction over a long period of time, even when used in the DC contact charging method. A process cartridge and an electrophotographic apparatus are also provided having such a charging member.

BEST MODE FOR CARRYING OUT THE EMBODIMENTS

In the first place, the construction of the charging member of the present invention is described.

The charging member of the present invention has a support, a conductive elastic layer formed on the support and a surface layer formed on the conductive elastic layer. This "surface layer" refers to the layer positioned at the outermost surface of the charging member, among the layers the charging member has.

The simplest construction of the charging member of the present invention is a construction in which the two layers, the conductive elastic layer and the surface layer, are formed on the support. One or two or more different layers may also be provided between the support and the conductive elastic layer or between the conductive elastic layer and the surface layer.

The conductive elastic layer and the surface layer may be formed using a material for the conductive elastic layer and a material for the surface layer, respectively (hereinafter referred to also as "multi-layer form 1"). In addition, a material for the conductive elastic layer may be used to from a layer and thereafter a surface region (the surface and the vicinity thereof) of that layer may be modified so that the region having been modified may serve as the surface layer, to afford a multi-layer construction having the conductive elastic layer and the surface layer (hereinafter referred to also as "multi-layer form 2").

Figure 1:
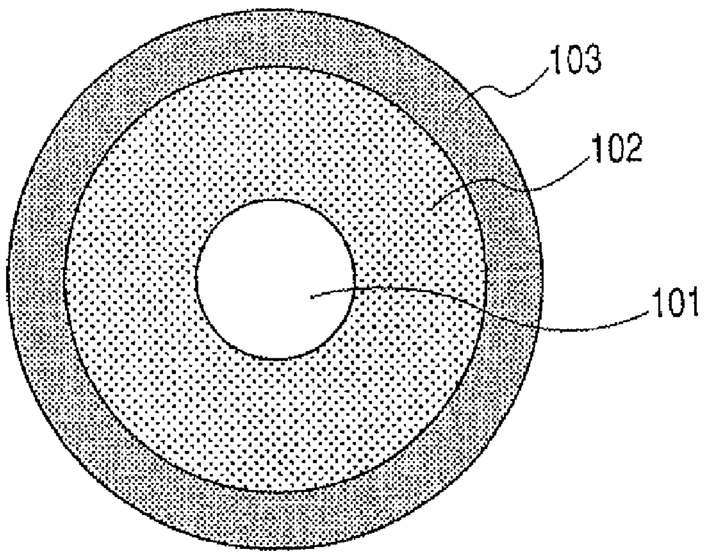
FIG. 1 illustrates an example of the construction of the charging member of the present invention.

FIG. 1 shows an example of the construction of the charging member of the present invention. In FIG. 1, reference character 101 denotes a support; 102, a conductive elastic layer; and 103, a surface layer.

The support of the charging member should have at least conductivity (conductive support). For example, a support made of a metal (or made of an alloy) such as iron, copper, stainless steel, aluminum, an aluminum alloy or nickel may be used. For the purpose of providing scratch resistance, surface treatment such as plating may also be applied to the surfaces of these supports as long as its conductivity is not impaired.

In the conductive elastic layer, one or two or more of elastic materials such as rubbers or thermoplastic elastomers may be used which are used in the elastic layers (conductive elastic layers) of conventional charging members.

The rubbers may include, e.g., urethane rubbers, silicone rubbers, butadiene rubbers, isoprene rubbers, chloroprene rubbers, styrene-butadiene rubbers, ethylene-propylene rubbers, polynorbornene rubbers, styrene-butadiene-styrene rubbers, acrylonitrile rubbers, epichlorohydrin rubbers and alkyl ether rubbers.

The thermoplastic elastomer may include, e.g., styrene type elastomers and olefin type elastomers. Commercially available products of the styrene type elastomers may include, e.g., RABARON, a product of Mitsubishi Chemical Corporation; and SEPTON COMPOUND, a product of Kuraray Co., Ltd. Commercially available products of the olefin type elastomers may include, e.g., THERMOLAN, a product of Mitsubishi Chemical Corporation; MILASTOMER, a product of Mitsui Petrochemical Industries, Ltd.; SUMITOMO TPE, a product of Sumitomo Chemical Co., Ltd.; and SANTOPRENE, a product of Advanced Elastomer Systems, L.P.

A conducting agent may also appropriately be used in the conductive elastic layer to adjust the conductivity to a stated value. The electrical resistance of the conductive elastic layer may be controlled by appropriately selecting the type and amount of the conducting agent to be used. The conductive elastic layer may have an electrical resistance of from $10^2\Omega$ or more to $10^8\Omega$ or less as a preferable range, and from $10^3\Omega$ or more to $10^6\Omega$ or less as a more preferable range.

The conducting agent used in the conductive elastic layer may include, e.g., cationic surface-active agents, anionic surface-active agents, amphoteric surface-active agents, antistatic agents and electrolytes.

The cationic surface-active agents may include, e.g., quaternary ammonium salts such as lauryl trimethylammonium, stearyl trimethylammonium, octadodecyl trimethylammonium, dodecyl trimethylammonium, hexadecyl trimethylammonium, and modified fatty acid dimethyl ethylammonium. The quaternary ammonium salts may include, e.g., perchlorate, chlorate, tetrafluoroborate, ethosulfate and benzyl halides (such as benzyl bromide and benzyl chloride).

The anionic surface-active agents may include, e.g., aliphatic sulfonates, higher alcohol sulfates, higher alcohol ethylene oxide addition sulfates, higher alcohol phosphates, and higher alcohol ethylene oxide addition phosphates.

The antistatic agents may include, e.g., nonionic antistatic agents such as higher alcohol ethylene oxides, polyethylene glycol fatty esters, and polyhydric alcohol fatty esters.

The electrolytes may include, e.g., salts (such as quaternary ammonium salts) of metals belonging to Group 1 of the periodic table (such as Li, Na and K). The salts of metals belonging to Group 1 of the periodic table may specifically include $LiCF_3SO_3$, $NaClO_4$, $LiAsF_6$, $LiBF_4$, NaSCN, KSCN and NaCl.

As the conducting agent for the conductive elastic layer, there may be used salts (such as $Ca(ClO_4)_2$) of metals belonging to Group 2 of the periodic table (such as Ca and Ba), and antistatic agents derived therefrom. The following may also be used: ion-conductive conducting agents such as complexes of these with polyhydric alcohols (such as 1,4-butanediol, ethylene glycol, polyethylene glycol, propylene glycol and polyethylene glycol) or derivatives thereof, and complexes of the above with monools (such as ethylene glycol monomethyl ether and ethylene glycol monoethyl ether).

As the conducting agent for the conductive elastic layer, there may be used conductive carbons such as KETJEN BLACK EC, acetylene black, carbon for use with rubber, carbon for use with color(ink) subjected to oxidation treatment, and thermally decomposed carbon. The carbon for use with rubber may specifically include, e.g., Super Abrasion Furnace (SAF: super-resistance to abrasion), Intermediate Super Abrasion Furnace (ISAF: intermediate super-resistance to abrasion), High Abrasion Furnace (HAF: high resistance to abrasion), Fast Extruding Furnace (FEF: good extrudability), General Purpose Furnace (GPF: general-purpose properties), Semi Reinforcing Furnace (SRF: semi-reinforcing properties), Fine Thermal (FT: thermally decomposed fine particles), and Medium Thermal (MT: thermally decomposed medium particles).

Graphites such as natural graphite and artificial graphite may also be used as the conducting agent for the conductive elastic layer.

Metal oxides such as tin oxide, titanium oxide and zinc oxide and metals such as nickel, copper, silver and germanium may also be used as the conducting agent for the conductive elastic layer.

Conductive polymers such as polyaniline, polypyrrole and polyacetylene may further be used as the conducting agent for the conductive elastic layer.

Inorganic or organic filler and a cross-linking agent may be added to the conductive elastic layer. Such filler may include, e.g., silica (white carbon), potassium carbonate, magnesium carbonate, clay, talc, zeolite, alumina, barium sulfate and aluminum sulfate. The cross-linking agent may include, e.g., sulfur, peroxides, cross-linking auxiliaries, cross-linking accelerators, cross-linking acceleration auxiliaries, and cross-linking retarders.

From the viewpoint of keeping the charging member from being deformed when the charging member and the charging object electrophotographic photosensitive member are brought into contact with each other, the conductive elastic layer may have a hardness of 70 degrees or more as Asker-C hardness, and, in particular, more preferably 73 degrees or more.

In the present invention, the Asker-C hardness is measured under the conditions of a load of 1,000 g, bringing a loaded needle of an Asker-C hardness meter (manufactured by Koubunshi Keiki Co., Ltd.) into touch with the surface of the measuring object.

From the viewpoint of sufficiently bringing out the function of the conductive elastic layer provided in order to ensure a contact nip between the electrophotographic photosensitive member and the charging member, the surface layer of the charging member may preferably have a modulus of elasticity of 2,000 MPa or less. On the other hand, since, in general, layers show a tendency to have a smaller cross-linking density as the layers have a smaller modulus of elasticity, the surface layer of the charging member may preferably have a modulus of elasticity of 100 MPa or more, from the viewpoint of keeping the surface of the electrophotographic photosensitive member from being contaminated with low-molecular weight components oozing out of the surface of the charging member.

As the surface layer has a larger layer thickness, the effect of keeping the low-molecular weight components from oozing tends to increase, but on the other hand, the charging performance tends to decrease. Accordingly, taking these into account, in the present invention, the surface layer may preferably have a layer thickness of from 0.01 μm to 1.0 μm, and more preferably from 0.01 to 0.6 μm.

From the viewpoint of keeping the toners and external additives from clinging to the surface of the charging member, the surface of the charging member (i.e., the surface of the surface layer) may preferably have a roughness (Rz) of 10 μm or less according to JIS 94, more preferably 7 μm or less, and still more preferably 5 μm or less.

The charging member of the present invention is, as described above, a charging member having a support, a conductive elastic layer formed on the support and a surface layer formed on the conductive elastic layer, wherein the surface layer contains a polysiloxane having at least one structure selected from the group consisting of a structure represented by the following formula (1a1), a structure represented by the following formula (1a2), a structure represented by the following formula (1b1) and a structure represented by the following formula (1b2).

(1a1)

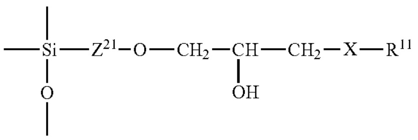

(1a2)

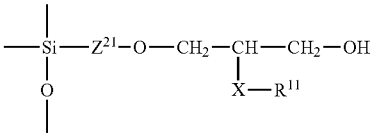

(1b1)

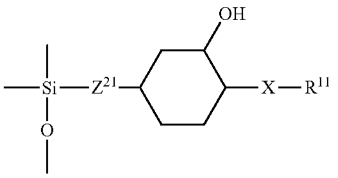

(1b2)

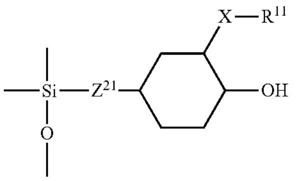

In the formulas (1a1), (1a2), (1b1) and (1b2), X represents one functional group selected from the group consisting of —O—, —$NR^{12}$— and —COO—. $R^{11}$ represents a hydrocarbon group. $R^{12}$ represents a hydrogen atom or a hydrocarbon group. $Z^{21}$ represents a divalent organic group.

The divalent organic group represented by $Z^{21}$ may include, e.g., alkylene groups and arylene groups. Of these, alkylene groups having 1 to 6 carbon atoms is preferred, and an ethylene group and a propylene group are more preferred.

$R^{11}$ in the formulas (1a1), (1a2), (1b1) and (1b2) may specifically represent a saturated or unsaturated monovalent hydrocarbon group which may include, e.g., alkyl groups, alkenyl groups and aryl groups. $R^{12}$ may specifically represent a hydrogen atom or a saturated or unsaturated monovalent hydrocarbon group which may include, e.g., alkyl groups, alkenyl groups and aryl groups. Hydrocarbon groups tend to be oriented toward the surface of the charging member. However, the hydrocarbon groups represented by $R^{11}$ and $R^{12}$ (except the case of hydrogen atoms) are not directly bonded to the siloxane chain. Accordingly, where the siloxane having the structure(s) represented by the formula (s) (1a1), (1a2), (1b1) and/or (1b2) is incorporated in the surface layer, the hydrocarbon groups represented by $R^{11}$ and $R^{12}$ (except the case of hydrogen atoms) may readily be oriented toward the surface of the surface layer, thus exhibiting the effect of keeping the charging member surface from being contaminated with the toners and external additives. In particular, a straight-chain or branched-chain alkyl group having 5 to 30 carbon atoms is preferred from the viewpoint of the orientation properties. The sum of the content of $R^{11}$ and the content of $R^{12}$ is preferably from 5.0 to 50.0% by mass based on the total mass of the polysiloxane.

The polysiloxane is more preferably one having an alkyl group and/or a phenyl group bonded to the silicon atom of the siloxane skeleton. This alkyl group is preferably a straight-chain or branched-chain alkyl group having 1 to 21 carbon atoms, and further preferably a methyl group, an ethyl group, a n-propyl group, a hexyl group or a decyl group.

The polysiloxane may be obtained by, e.g., the following methods:

A method in which a hydrolysis condensation product containing a hydrolyzable silane compound having at its end an epoxy group whose structure is represented by the following formula (2a) or (2b) (hereinafter referred to also as "compound 2") is produced and thereafter the hydrolysis condensation product is allowed to react with a modified olefin compound represented by the following formula (3) (hereinafter referred to also as "compound 3"); or A method in which the compound 2 is allowed to react with the compound 3, followed by hydrolysis.

(2a)

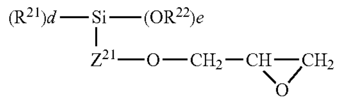

(2b)

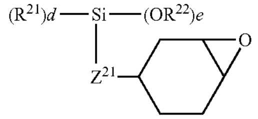

From the viewpoint of the orientation properties of $R^{11}$ and $R^{12}$, the polysiloxane of the present invention may preferably be produced by the method in which the hydrolysis condensation product containing the compound 2 is produced and thereafter the hydrolysis condensation product is allowed to react with the compound 3.

In the formulas (2a) and (2b), $R^{21}$ represents a saturated or unsaturated monovalent hydrocarbon group, $R^{22}$ represents a saturated or unsaturated monovalent hydrocarbon group, $Z^{21}$ represents a divalent organic group, d is an integer of 0 or 2, e is an integer of 1 to 3, and d+e=3.

The saturated or unsaturated monovalent hydrocarbon group represented by $R^{21}$ and $R^{22}$ in the formula (2a) and (2b) may include alkyl groups, alkenyl groups and aryl groups. Of these, a straight-chain or branched-chain alkyl group having 1 to 3 carbon atoms is preferable, and a methyl group or an ethyl group is more preferable.

The e in the formulas (2a) and (2b) may preferably be 3.

Where the d in the formulas (2a) and (2b) is 2, two of $R^{21}$ may be the same or different.

Where the e in the formulas (2 a) and (2b) is 2 or 3, the two or three of $R^{22}$ may be the same or different.

Specific examples of the compound (2) are shown below.

(2-1): Glycidoxypropyltrimethoxysilane
(2-2): Glycidoxypropyltriethoxysilane
(2-3): Epoxycyclohexylethyltrimethoxysilane
(2-4): Epoxycyclohexylethyltriethoxysilane $$R^{31}—X—H \quad (3)$$

In the case where the compound 2 is used, it is important for the compound 3 to have a functional group capable of reacting with the epoxy group of the compound 2. The X constituting such a functional group represents one group selected from the group consisting of —O—, —$NR^{32}$— and —COO—. $R^{31}$ represents a saturated or unsaturated monovalent hydrocarbon group. $R^{32}$ represents a hydrogen atom or a saturated or unsaturated monovalent hydrocarbon group.

The saturated or unsaturated monovalent hydrocarbon group represented by $R^{31}$ and $R^{32}$ in the formula (3) may include, e.g., phenyl-substituted alkyl or alkenyl, or unsubstituted alkyl or alkenyl, and alkyl-substituted aryl or unsubstituted aryl. These hydrocarbon groups tend to be oriented toward the surface of the charging member, and exhibit the effect of keeping the charging member surface from being contaminated with toner and external additives. The $R^{31}$ may preferably have 5 or more carbon atoms from the viewpoint of orientation properties, and may preferably have 100 or less, and particularly preferably 30 or less, carbon atoms from the viewpoint of compatibility of the hydrolyzable silane compound with the hydrolysis condensation product.

Specific examples of the compound 3 are shown below.

(3-1): $CH_3$—OH
(3-2): $CH_3$—$CH_2$—OH
(3-3): $CH_3$—$CH_2$—$NH_2$
(3-4): $CH_3$—$CH_2$—COOH
(3-5): $CH_3$—$(CH_2)_5$—COOH
(3-6): $CH_3$—$(CH_2)_{17}$—$NH_2$
(3-7): $CH_3$—$(CH_2)_{19}$—OH
(3-8): $CH_3$—$(CH_2)_{18}$—COOH
(3-9): $CH_3$—$(CH_2)_{19}$—OH
(3-10): $CH_3$—$(CH_2)_{15}$—$C_6H_4$—$NH_2$
(3-11): $CH_3$—$(CH_2)_{28}$—COOH
(3-12): $CH_3$—$(CH_2)_{29}$—OH

The polysiloxane used in the charging member of the present invention may be obtained by, as described above, condensing by hydrolysis the compound 2 to produce a hydrolysis condensation product, then cleaving the epoxy group of the compound 2 to cross-link the compound 3 and the hydrolysis condensation product. In this case, from the viewpoint of controlling surface properties of the charging member, for obtaining the hydrolysis condensation product, it is preferable to further use, in addition to the compound (2), a hydrolyzable silane compound having a structure represented by the following formula (4) (hereinafter referred to also as "compound 4").

$$(R^{41})_a—Si—(OR^{42})_b \quad (4)$$

In the formula (4), $R^{41}$ represents phenyl-substituted or unsubstituted alkyl, or alkyl-substituted or unsubstituted aryl. $R^{42}$ represents a saturated or unsaturated monovalent hydrocarbon group. a is an integer of 0 to 3, b is an integer of 1 to 4, and a+b=4.

The alkyl of the phenyl-substituted alkyl or unsubstituted alkyl represented by $R^{41}$ in the formula (4) may preferably be a straight-chain alkyl group having 1 to 21 carbon atoms.

The aryl group of the alkyl-substituted or unsubstituted aryl represented by $R^{41}$ in the formula (4) may preferably be a phenyl group.

The a in the formula (4) may preferably be an integer of 1 to 3, and more preferably 1.

The b in the formula (4) may preferably be an integer of 1 to 3, and more preferably 3.

The saturated or unsaturated monovalent hydrocarbon group represented by $R^{42}$ in the formula (4) may include, e.g., alkyl groups, alkenyl groups and aryl groups. Of these, straight-chain or branched-chain alkyl groups having 1 to 3 carbon atoms are preferred, and may further preferably be a methyl group, an ethyl group or a n-propyl group.

Where the a in the formula (4) is 2 or 3, the two or three of $R^{41}$ may be the same or different.

Where the b in the formula (4) is 2, 3 or 4, the two, three or four of $R^{42}$ may be the same or different.

Specific examples of the compound 4 are shown below.

(4-1): Tetramethoxysilane
(4-2): Tetraethoxysilane
(4-3): Tetrapropoxysilane
(4-4): Methyltrimethoxysilane
(4-5): Methyltriethoxysilane
(4-6): Methyltripropoxysilane
(4-7): Ethyltrimethoxysilane
(4-8): Ethyltriethoxysilane
(4-9): Ethyltripropoxysilane
(4-10): Propyltrimethoxysilane
(4-11): Propyltriethoxysilane
(4-12): Propyltripropoxysilane
(4-13): Hexyltrimethoxysilane
(4-14): Hexyltriethoxysilane
(4-15): Hexyltripropoxysilane
(4-16): Decyltrimethoxysilane
(4-17): Decyltriethoxysilane
(4-18): Decyltripropoxysilane
(4-19): Phenyltrimethoxysilane
(4-20): Phenyltriethoxysilane
(4-21): Phenyltripropoxysilane
(4-22): Diphenyldimethoxysilane
(4-23): Diphenyldiethoxysilane In the case when the compound 4 is used in combination, the a in the formula (4) is preferably an integer of 1 to 3, and the b is preferably an integer of 1 to 3.

Only one type of the compound 4 may be used, or two or more types of the compound 4 may be used. In the case where two or more types of the compound 4 are used, the compound in which the $R^{41}$ in the formula (4) is an alkyl group(s) and the compound in which the $R^{41}$ in the formula (4) is a phenyl group(s) may preferably be used in combination. The alkyl group is preferable from the viewpoint of controlling surface properties of the charging member. Though the reason is unclear, the phenyl group has an influence on the discharge at the time of charging, and is preferred from the viewpoint of preventing a phenomenon such that when halftone images are reproduced, characters or black figures formed previously remain slightly as afterimages (ghost phenomenon).

A specific process for producing the charging member of the present invention (how to specifically form the surface layer containing the polysiloxane) is described below.

First, the compound 2 and optionally the compound 4 are subjected to hydrolysis reaction in the presence of water to produce a hydrolysis condensation product.

In the hydrolysis reaction, a hydrolysis condensation product having the desired degree of condensation is obtainable by controlling temperature, pH and so forth.

In the hydrolysis reaction, the degree of condensation may also be controlled by utilizing a metal alkoxide as a catalyst for the hydrolysis reaction. The metal alkoxide may include, e.g., aluminum alkoxides, titanium alkoxides and zirconium alkoxides, and complexes (such as acetyl acetone complexes) thereof.

Next, the compound 3 is added to, and mixed with, the resulting hydrolysis condensation product to prepare a surface layer coating solution.

The compound 2, the compound 3 and the compound 4 may preferably be so mixed that the modified olefin in the polysiloxane obtained is in a content of from 5 to 50% by mass based on the total mass of the polysiloxane. Controlling the mixing proportion to be 5% by mass or more can keep the surface of the charging member from being contaminated, in virtue of the orientation of olefin moieties to the surface of the charging member. Controlling the mixing proportion to be 50% by mass or less allows the surface layer to have mechanical strength even when the surface layer is formed in a thin film and can keep faulty images from occurring due to contamination of the surface, even when the charging member is used over a long period of time.

The mixing proportion of compound 3 to compound 2 may preferably be 5 mol % or more to 50 mol % or less. Controlling the mixing proportion to be 5 mol % or more can keep the surface of the charging member from being contaminated, in virtue of the orientation of olefin moieties to the surface of the charging member. Controlling the mixing proportion to be 50 mol % or less allows the surface layer to have mechanical strength in virtue of siloxane linkage chains produced by the cross-linking reaction of epoxy groups themselves. Hence, even in long-term service of the charging member, faulty images resulting from the contamination of the surface can be prevented from occurring.

In the case where the compound 4 is used in combination, the compound 2 and the compound 4 may further preferably be so mixed as to be in a molar ratio ranging from 10:1 to 1:10.

Next, a member having the support and the conductive elastic layer formed on the support, which is herein referred to also as "conductive elastic member", is coated with the surface layer coating solution thus prepared.

In preparing the surface layer coating solution, besides the hydrolysis condensation product, a suitable solvent may be used in order to improve coating performance. Such a suitable solvent may include, e.g., alcohols such as ethanol and 2-butanol, ethyl acetate, and methyl ethyl ketone, or a mixture of any of these solvents. Coating methods such as coating using a roll coater, dip coating or ring coating may be employed in coating the conductive elastic member with the surface layer coating solution.

Next, the surface layer coating solution applied on the conductive elastic member is irradiated with active energy radiation, thus epoxy groups in the compound 2 contained in the surface layer coating solution are cleaved, whereby compound 2 and compound 3 are combined and the hydrolysis condensation product can be cross-linked by the reaction between epoxy groups.

As the active energy radiation used in the present invention, ultraviolet radiation is preferred. Because of the heat generated at the time of the irradiation with active energy radiation, the conductive elastic layer of the conductive elastic member is expanded, and then cooled to contract. In that course, if the surface layer does not sufficiently follow this expansion and contraction, the surface layer may come to have many wrinkles or cracks. However, where the ultraviolet radiation is used in the cross-linking reaction, the hydrolysis condensation product can be cross-linked in a short time (within 15 minutes) and moreover the heat generated is reduced. Hence, the surface layer does not easily wrinkle or crack.

Where the charging member is placed in an environment causative of abrupt changes in temperature and humidity, the surface layer may wrinkle or crack if the surface layer does not sufficiently follow the expansion and contraction of the conductive elastic layer which have been caused by such changes in temperature and humidity. However, as long as the cross-linking reaction is carried out using the ultraviolet radiation in which the heat generated is reduced, the adherence between the conductive elastic layer and the surface layer is improved to enable the surface layer to sufficiently follow the expansion and contraction of the conductive elastic layer. Hence, the surface layer can be kept from wrinkling or cracking because of the changes in temperature and humidity.

In addition, as long as the cross-linking reaction is carried out using the ultraviolet radiation, the conductive elastic layer can be kept from deteriorating due to heat history, and hence the electrical properties of the conductive elastic layer can be kept from being lowered.

In the irradiation with ultraviolet radiation, there may be used a high-pressure mercury lamp, a metal halide lamp, a low-pressure mercury lamp or an excimer UV lamp. Of these, an ultraviolet radiation source may be used which is rich in light of from 150 nm to 480 nm in wavelength as ultraviolet radiation.

The ultraviolet radiation has the integral light quantity defined as shown below.

Ultraviolet radiation integral light quantity ($mJ/cm^2$)= ultraviolet radiation intensity ($mW/cm^2$)×irradiation time (s).

The integral light quantity of the ultraviolet radiation may be controlled by selecting irradiation time, lamp output, and the distance between the lamp and the object to be irradiated. The integral light quantity may also be sloped within the irradiation time.

Where the low-pressure mercury lamp is used, the integral light quantity of the ultraviolet radiation may be measured with an ultraviolet radiation integral light quantity meter UIT-150-A or UVD-S254, manufactured by Ushio Inc. Where the excimer UV lamp is used, the integral light quantity of the ultraviolet radiation may be measured with an ultraviolet radiation integral light quantity meter UIT-150-A or VUV-S172, manufactured by Ushio Inc.

In the reaction with the modified olefin due to the cleavage of epoxy groups and the cross-linking reaction, a catalyst such as an aromatic sulfonium salt or an aromatic iodonium salt may be coexistent from the viewpoint of improving the cross-linking efficiency. The catalyst may preferably be added in an amount of from 1 to 3% by mass based on the hydrolysis condensation product.

Figure 2:
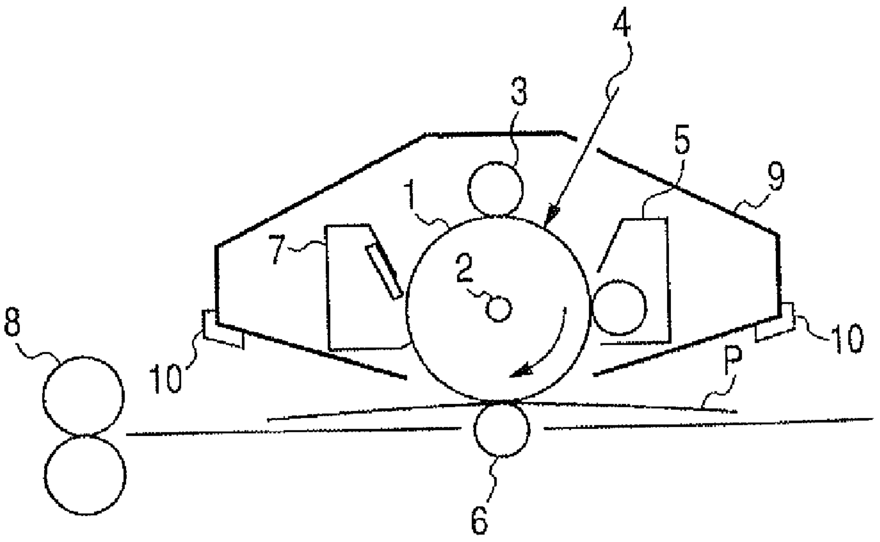
FIG. 2 schematically illustrates an example of the construction of an electrophotographic apparatus provided with a process cartridge having the charging member of the present invention.

An example of the construction of an electrophotographic apparatus provided with a process cartridge having an electrophotographic photosensitive member and the charging member of the present invention is schematically shown in FIG. 2.

In FIG. 2, reference numeral 1 denotes a cylindrical electrophotographic photosensitive member, which is rotatively driven around an axis 2 in the direction of an arrow at a stated peripheral speed. As the electrophotographic photosensitive member, one is common having a support and an inorganic or organic photosensitive layer formed on the support. The electrophotographic photosensitive member may also be one having a charge injection layer as a surface layer.

The surface of the electrophotographic photosensitive member 1 being rotatively driven is uniformly charged to a positive or negative, given potential through a charging member 3 (in FIG. 2, a roller-shaped charging member) which is the charging member of the present invention. The electrophotographic photosensitive member thus charged is then exposed to exposure light (imagewise exposure light) 4 emitted from an exposure means (not shown) for slit exposure or laser beam scanning exposure. In this way, electrostatic latent images corresponding to intended images are successively formed on the surface of the electrophotographic photosensitive member 1.

In charging the surface of the electrophotographic photosensitive member by means of the charging member 3, a direct-current voltage only or a voltage generated by superimposing an alternating-current voltage on a direct-current voltage is applied to the charging member 3 from a voltage applying means (not shown). In Examples given later, only a direct-current voltage (−1,200 V) is applied. Also, in Examples given later, dark-area potential is set at −600 V, and light-area potential at −350 V.

The electrostatic latent images thus formed on the surface of the electrophotographic photosensitive member 1 are developed (in reversal development or regular development) with a toner contained in a developer in a developing means 5 to come into toner images. The toner images thus formed and held on the surface of the electrophotographic photosensitive member 1 are then successively transferred by the aid of a transfer bias given from a transfer means (such as a transfer roller) 6 to a transfer material (such as paper) P fed from a transfer material feed means (not shown) into between the electrophotographic photosensitive member 1 and the transfer means 6 (contact part) in such a manner as synchronized with the rotation of the electrophotographic photosensitive member 1.

The developing means may include, e.g., a jumping developing means, a contact developing means and a magnetic-brush developing means. The contact developing means is preferred from the viewpoint of better keeping the toner from scattering. In Examples given later, the contact developing means is employed.

As the transfer roller, one may be exemplified having a support which is covered with an elastic resin layer controlled to have a medium resistance.

The transfer material P to which the toner images have been transferred is separated from the surface of the electrophotographic photosensitive member 1, guided into a fixing means 8, where the toner images are fixed, and then put out of the apparatus as an image-formed material (a print or a copy). In the case of a double-side image formation mode or a multiple image formation mode, this image-formed material is guided into a re-circulation transport mechanism (not shown), and introduced again to the transfer section.

The surface of the electrophotographic photosensitive member 1 from which the toner images have been transferred is subjected to the removal of the developer (toner) remaining after the transfer, through a cleaning means (such as a cleaning blade) 7. Thus the electrophotographic photosensitive member is cleaned on its surface. It is further subjected to charge elimination by pre-exposure light (not shown) emitted from a pre-exposure means (not shown), and thereafter repeatedly used for the image formation. Where the charging means is a contact charging means, the pre-exposure is not necessarily needed.

Plural components from among the above electrophotographic photosensitive member 1, charging member 3, developing means 5, transfer means 6 and cleaning means 7 are integrally held together in a container to constitute a process cartridge which is detachably mountable to the main body of the electrophotographic apparatus such as a copying machine or a laser beam printer. In FIG. 2, the electrophotographic photosensitive member 1, the primary charging unit 3, the developing means 5 and the cleaning means 7 are integrally supported to form a process cartridge 9 that is detachably mountable to the main body of the apparatus through a guide means 10 such as rails installed in the main body of the electrophotographic apparatus.

EXAMPLES

The present invention is described below in greater detail by giving specific working examples. However, it should be noted that the present invention is by no means limited to these examples. In Examples, "part(s)" refers to "part(s) by mass".

Example 1

100 parts of epichlorohydrin rubber (trade name: EPICHLOMER CG105, available from Daiso Co., Ltd.), 25 parts of MT carbon (trade name: HTC #20; available from Shin Nippon Carbon Co. Ltd.) as a filler, 5 parts of bentonite (trade name: BENGEL SH, available from HOJUN Co., Ltd.), 10 parts of zinc oxide and 1.5 parts of stearic acid were kneaded for 5 minutes by means of a kneader. To the kneaded product obtained, 1 part of di-2-benzothiazolyl disulfide (trade name: NOCCELER DM-P, available from Ouchi-Shinko Chemical Industrial Co., Ltd.) as a vulcanization accelerator, 1.5 parts of tetraethylthiuram monosulfide (trade name: NOCCELER TS, available from Ouchi-Shinko Chemical Industrial Co., Ltd.) as a vulcanization accelerator and 1 part of sulfur as a vulcanizing agent were added, and kneaded for further 10 minutes by means of an open roll to prepare a kneaded product I.

Next, the kneaded product I was extruded by means of a rubber extruder into a cylindrical form of 9.5 mm in outer diameter and 5.4 mm in inner diameter. This was cut in a length of 250 mm, and then primarily vulcanized in a vulcanizer for 30 minutes using 160° C. water vapor to prepare a primary-vulcanized tube I for conductive elastic layer.

A support made of steel (whose surface nickel plating had been applied to) in a columnar shape of 6 mm in diameter and 256 mm in length was coated with a metal- and rubber-containing heat-hardening adhesive (trade name: METALOCK U-20, available from Toyokagaku Kenkyusho Co., Ltd.) in the areas up to 115.5 mm on both sides from the middle of the column surface in the axial direction (the area of 231 mm in total in width in the axial direction). The coating thus formed was dried at 80° C. for 30 minutes, and thereafter, further dried at 120° C. for 1 hour.

This support whose columnar surface was coated with the heat-hardening adhesive and dried, was inserted into the primary-vulcanized tube I for conductive elastic layer, and thereafter the primary-vulcanized tube I for conductive elastic layer was heated at 160° C. for 1 hour. By this heating, the primary-vulcanized tube I for conductive elastic layer was secondarily vulcanized, and also the heat-hardening adhesive was cured. Thus, a conductive elastic roller I before surface grinding was obtained.

Next, the conductive elastic roller I before surface grinding was cut at both ends of the conductive elastic layer portion (rubber portion) so that the conductive elastic layer portion had a width of 231 mm in the axial direction. Thereafter, the surface of the conductive elastic layer portion was ground with a rotary grinding wheel. As a result, a conductive elastic roller II (conductive elastic roller after surface grinding) was obtained which was in a crown shape of 8.2 mm in diameter at end portions and 8.5 mm in diameter at the middle portion, and had a surface ten-point average roughness (Rz) of 4.3 μm and a run-out of 19 μm.

The conductive elastic roller (conductive elastic roller after surface grinding) II thus obtained had a hardness of 71 degrees (Asker-C hardness).

Next, to obtain a treating agent for the surface layer, 35.64 g (0.128 mol) of glycidoxypropyltriethoxysilane (GPTES), 30.77 g (0.128 mol) of phenyltriethoxysilane (PhTES) and 13.21 g (0.064 mol) of hexyltrimethoxysilane (HeTMS) as a hydrolyzable silane compound and also 25.93 g of water and 63.07 g of ethanol were put into a 300 ml egg-plant-type flask and mixed. Thereafter, the mixture obtained was stirred at room temperature for 30 minutes, and then heat-refluxed for 24 hours on an oil bath set at 120° C., to produce a condensation product A (solid content: 28% by mass) of the hydrolyzable silane compound.

25 g of this condensation product A was added to a mixed solvent of 5 g of 2-butanol and 65 g of ethanol to prepare a solution. To this solution, 1.49 g (0.0095 mol) of decylamine (the number of carbon atoms in $R^{31}$ of the formula 3: 10) was so added that it was in a proportion of 49 mol % with respect to the glycidyl group and the modified olefin in the polysiloxane was in a content of 11% by mass, followed by stirring to prepare a condensation product-containing alcohol solution A.

To 100 g of this condensation product-containing alcohol solution A, 0.35 g of an aromatic sulfonium salt (trade name: ADEKA OPTOMER SP-150, available from Asahi Denka Kogyo K.K.) as a cationic photopolymerization initiator was added to prepare a surface layer coating solution A.

Next, the conductive elastic layer of the conductive elastic roller (conductive elastic roller after surface grinding) II was coated with the surface layer coating solution A by ring coating, dried at room temperature, and thereafter irradiated with ultraviolet radiation of 254 nm in wavelength so as to be in an integral light quantity of 9,000 mJ/cm$^2$ to cure the surface layer coating solution A (curing by cross-linking reaction) and then dried to form a surface layer. Thus, a charging roller 1 was produced. A low-pressure mercury lamp manufactured by Harison Toshiba Lighting Corp. was used in the irradiation with ultraviolet radiation.

The compositional analysis of the surface layer of the charging roller 1 was carried out in the following way.

Under an optical microscope of 10 to 1,000 magnifications, about 1 mg of a sample was collected from the surface layer using a three-dimensional coarse-fine adjustment micromanipulator (manufactured by K.K. Narishige) set in the optical microscope.

The sample collected was examined by the TG-MS method (an MS device is directly combined with a TG device), and changes in concentration per mass number of the gas generated at the time of heating were traced as the function of temperature along with changes in weight. The conditions of the measurement are shown in Table 1.

TABLE 1

| | | |
|---|---|---|
| Instrument | TG device | TG-40 Model, manufactured by Shimadzu Corporation |
| | MS device | GC/MS QP1000(1), manufactured by Shimadzu Corporation |
| Measurement conditions | Start of measurement | The sample is set in the TG device, and after carrier gas is flowed for 15 minutes or more, heating is started. |
| | Heating conditions | From room temperature to 1,000° C. (heating rate: 20° C./min). |
| MS sensitivity | Gain 3.5 | |
| Range of mass number | m/z = 10 to 300. m of m/z represents the mass number; and z, the valence of ions. Usually, the valence of ions is 1 and hence m/z corresponds to the mass number. | |
| Atmosphere | Helium (He) flow (30 ml/min) | |

The sample collected was also analyzed by the solid NMR method. JNM-EX400, manufactured by JEOL Ltd., was used as an analyzer and a 6 mm CP/MAS probe was used as a probe to measure 13C nuclei. Adamantane was used as a reference substance. The measurement was carried out under the conditions of a pulse width of 5.2 microseconds, a contact time of 2 milliseconds and the number of sample revolutions of 6 kHz.

The above analysis results were analyzed to ascertain a structure wherein the X in the formula (1a1) was —NH— and $R^{11}$ was an alkyl group having 10 carbon atoms. A structure was also ascertained wherein the X in the formula (1a2) was —NH— and $R^{11}$ was an alkyl group having 10 carbon atoms. It is considered that the glycidoxy group of glycidoxypropyltrimethoxysilane was cleaved by the irradiation with ultraviolet radiation to be allowed to react with the decylamine.

The charging roller 1 produced as described above was evaluated in the following way.

Evaluation of Charging Roller:

Using the charging roller I, images were reproduced and evaluated as shown below.

The charging roller 1 produced and an electrophotographic photosensitive member were incorporated into a process cartridge in which these were to be integrally supported. This process cartridge was mounted to a laser beam printer for A4-paper lengthwise paper feed. This laser beam printer was of a reversal development system where transfer material feed speed is 47 mm/s, and image resolution was 600 dpi.

The electrophotographic photosensitive member incorporated in the process cartridge together with the charging roller 1 was an organic electrophotographic photosensitive member having a support and an organic photosensitive layer formed thereon having a layer thickness of 14 μm. This organic photosensitive layer was of a multi-layer type having a charge generation layer and a charge transport layer containing a modified polycarbonate (binder resin), which are superposed in this order from the support side. This charge transport layer was the surface layer of the electrophotographic photosensitive member.

A toner used in the laser beam printer was the so-called polymerization toner containing toner particles produced by suspension-polymerizing in an aqueous medium a polymerizable monomer system including a wax, a charge control agent, a colorant, styrene, butyl acrylate and ester monomers, and fine silica particles and fine titanium oxide particles externally added to the toner particles. The glass transition temperature and volume-average particle diameter of the polymerization toner was 63° C. and 6 μm, respectively.

Images were reproduced in an environment of 30° C./80% RH. Halftone images (which were comprised of horizontal dotted lines with a width of one dot between lines and 2 spaces between dots, drawn in the direction perpendicular to the rotational direction of the electrophotographic photosensitive member) were formed on A4-size paper, and this was reproduced on 6,000 sheets at a process speed of 47 mm/s.

Evaluation was made by visually observing the images reproduced at the initial stage, on the 3,000th sheet and on the 6,000th sheet.

Evaluation criteria are as shown below.

AA: No charging non-uniformity due to toners and external additives clinging to the surface of the charging roller is observed on reproduced images.

A: Almost no charging non-uniformity due to toners and external additives clinging to the surface of the charging roller is observed on reproduced images.

B: Charging non-uniformity due to toners and external additives clinging to the surface of the charging roller is slightly observed on reproduced images.

C: Charging non-uniformity due to toners and external additives clinging to the surface of the charging roller is observed on reproduced images, and such charging non-uniformity comes about to a great extent. Specifically, charging non-uniformity in a white vertical line state is observed.

To determine the electrical resistance of the charging roller, a foam was brought into contact with a cylindrical metallic drum, and the drum was rotated, and 100 V of direct-current voltage was applied between a conductive substrate and the metallic drum, where the voltage applied to a resistor connected to the drum in series was measured.

The evaluation and measurement results are shown in Table 2.

Example 2

A charging roller was produced in the same manner as in Example 1 except that the surface layer coating solution A was changed to a surface layer coating solution B. This charging roller is designated as a charging roller 2.

The surface layer coating solution B was prepared in the following way.

25 g of the condensation product A was added to a mixed solvent of 5 g of 2-butanol and 65 g of ethanol to prepare a solution. To this solution, 0.89 g (0.0087 mol) of hexanol (the number of carbon atoms in $R^{31}$ of the formula 3: 6) was so added that it was in a proportion of 46 mol % with respect to the glycidyl group and the modified olefin in the polysiloxane was in a content of 7% by mass, followed by stirring to prepare a condensation product-containing alcohol solution B.

To 100 g of this condensation product-containing alcohol solution B, 0.35 g of an aromatic sulfonium salt (trade name: ADEKA OPTOMER SP-150, available from Asahi Denka Kogyo K.K.) as a cationic photopolymerization initiator was added to prepare the surface layer coating solution B.

The compositional analysis of the surface layer was carried out in the same manner as in Example 1.

The analysis results were analyzed to ascertain a structure wherein X in the formula (1a1) was —O— and $R^{11}$ was an alkyl group having 6 carbon atoms. A structure was also ascertained wherein X in the formula (1a2) was —O— and $R^{11}$ was an alkyl group having 6 carbon atoms. It is considered that the glycidoxy group of glycidoxypropyltrimethoxysilane was cleaved by the irradiation with ultraviolet radiation to be allowed to react with the hexanol.

The same evaluation and measurement as in Example 1 were made on the charging roller 2. The evaluation and measurement results are shown in Table 2.

Example 3

A charging roller was produced in the same manner as in Example 1 except that the surface layer coating solution A was changed to a surface layer coating solution C. This charging roller is designated as a charging roller 3.

The surface layer coating solution C was prepared in the following way.

47.616 g (0.192 mol) of β-(3,4-epoxycyclohexyl)ethyltrimethoxysilane and 30.72 g (0.128 mol) of phenyltriethoxysilane (PhTES) as hydrolyzable silane compounds as well as 25.93 g of water and 61.5 g of ethanol were mixed. Thereafter, the mixture obtained was stirred at room temperature, then heat-refluxed for 24 hours to obtain a condensation product C of hydrolyzable silane compounds.

25 g of the condensation product C was added to a mixed solvent of 5 g of 2-butanol and 65 g of ethanol to prepare a solution. To this solution, 3.72 g (0.016 mol) of pentadecylamine (the number of carbon atoms in $R^{31}$ of the formula 3: 15) was so added that it was in a proportion of 57 mol % with respect to the epoxy group and the modified olefin in the polysiloxane was in a content of 24% by mass, followed by stirring to prepare a condensation product-containing alcohol solution C.

To 100 g of this condensation product-containing alcohol solution C, 0.35 g of an aromatic sulfonium salt (trade name: ADEKA OPTOMER SP-150, available from Asahi Denka Kogyo K.K.) as a cationic photopolymerization initiator was added to prepare the surface layer coating solution C.

The compositional analysis of the surface layer formed was made in the same manner as in Example 1.

The analysis results were analyzed to ascertain a structure wherein X in the formula (1b1) was —NH— and $R^{11}$ was an alkyl group having 15 carbon atoms. A structure was also ascertained wherein X in the formula (1b2) was —NH— and $R^{11}$ was an alkyl group having 15 carbon atoms. It is considered that the epoxy group of β-(3,4-epoxycyclohexyl)ethyltrimethoxysilane was cleaved by the irradiation with ultraviolet radiation to be allowed to react with the pentadecylamine.

The same evaluation and measurement as in Example 1 were made on the charging roller 3 produced. The evaluation and measurement results are shown in Table 2.

Example 4

A charging roller was produced in the same manner as in Example 1 except that the surface layer coating solution A was changed to a surface layer coating solution D. This charging roller is designated as a charging roller 4.

The surface layer coating solution D was prepared in the following way.

25 g of the condensation product A was added to a mixed solvent of 5 g of 2-butanol and 65 g of ethanol to prepare a solution. To this solution obtained, 0.37 g (0.0008 mol) of triacontanoic acid (the number of carbon atoms in $R^{31}$ of the formula 3: 29) was so added that it was in a proportion of 4 mol % with respect to the glycidyl group and the modified olefin in the polysiloxane was in a content of 3% by mass, followed by stirring to prepare a condensation product-containing alcohol solution D.

To 100 g of this condensation product-containing alcohol solution D, 0.35 g of an aromatic sulfonium salt (trade name: ADEKA OPTOMER SP-150, available from Asahi Denka Kogyo K.K.) as a cationic photopolymerization initiator was added to prepare the surface layer coating solution D.

The compositional analysis of the surface layer formed was made in the same manner as in Example 1.

The analysis results were analyzed to ascertain a structure wherein X in the formula (1a1) was —COO— and $R^{11}$ was an alkyl group having 29 carbon atoms. A structure was also ascertained wherein X in the formula (1a2) was —COO— and $R^{11}$ was an alkyl group having 29 carbon atoms. It is considered that the glycidoxy group of glycidoxypropyltrimethoxysilane was cleaved by the irradiation with ultraviolet radiation to be allowed to react with the triacontanoic acid.

The same evaluation and measurement as in Example 1 were made on the charging roller 4 produced. The evaluation and measurement Results are shown in Table 2.

Example 5

A charging roller was produced in the same manner as in Example 1 except that the surface layer coating solution A was changed to a surface layer coating solution E. This charging roller is designated as a charging roller 5.

The surface layer coating solution E was prepared in the following way.

25 g of the condensation product A was added to a mixed solvent of 5 g of 2-butanol and 65 g of ethanol to prepare a solution. To this solution, 1.2 g (0.013 mol) of butyric acid (the number of carbon atoms in $R^{31}$ of the formula 3: 3) was so added that it was in a proportion of 71 mol % with respect to the glycidyl group and the modified olefin in the polysiloxane was in a content of 9% by mass, followed by stirring to prepare a condensation product-containing alcohol solution E.

To 100 g of this condensation product-containing alcohol solution E, 0.35 g of an aromatic sulfonium salt (trade name: ADEKA OPTOMER SP-150, available from Asahi Denka Kogyo K.K.) as a cationic photopolymerization initiator was added to prepare the surface layer coating solution E.

The compositional analysis of the surface layer formed was made in the same manner as in Example 1.

The analysis results were analyzed to ascertain a structure wherein X in the formula (1a1) was —COO— and $R^{11}$ was an alkyl group having 3 carbon atoms. A structure was also ascertained wherein X in the formula (1a2) was —COO— and $R^{11}$ was an alkyl group having 3 carbon atoms. It is considered that the glycidoxy group of glycidoxypropyltrimethoxysilane was cleaved by the irradiation with ultraviolet radiation to be allowed to react with the butyric acid.

The same evaluation and measurement as in Example 1 were made on the charging roller 5 produced. The evaluation and measurement results are shown in Table 2.

Comparative Example 1

A charging roller was produced in the same manner as in Example 1 except that the surface layer coating solution A was changed to a surface layer coating solution F. This charging roller is designated as a charging roller 6.

The surface layer coating solution F was prepared in the following way.

25 g of the condensation product A was added to a mixed solvent of 5 g of 2-butanol and 65 g of ethanol, followed by stirring to prepare a condensation product-containing alcohol solution F.

To 100 g of this condensation product-containing alcohol solution F, 0.35 g of an aromatic sulfonium salt (trade name: ADEKA OPTOMER SP-150, available from Asahi Denka Kogyo K.K.) as a cationic photopolymerization initiator was added to prepare the surface layer coating solution F.

The same evaluation and measurement as in Example 1 were made on the charging roller 6 produced. The evaluation and measurement results are shown in Table 2.

TABLE 2

| | | Layer thickness of surface layer (μm) | Resistance of charging member (Ω) | Image evaluation Initial stage | 3,000th sheet | 6,000th sheet |
|---|---|---|---|---|---|---|
| Example 1 | Charging roller 1 | 0.3 | $5.1 \times 10^4$ | AA | AA | AA |
| Example 2 | Charging roller 2 | 0.4 | $2.1 \times 10^4$ | AA | AA | AA |
| Example 3 | Charging roller 3 | 0.3 | $8.1 \times 10^4$ | AA | AA | A |
| Example 4 | Charging roller 4 | 0.3 | $5.5 \times 10^4$ | AA | A | B |
| Example 5 | Charging roller 5 | 0.3 | $1.5 \times 10^4$ | AA | AA | B |
| Comparative Example 1 | Charging roller 6 | 0.2 | $5.1 \times 10^4$ | AA | C | C |

As described above, the present invention provides a charging member in which toners and external additives used in the toners clinging to its surface can be minimized even when repeatedly used over a long period of time and which can therefore perform stable charging and image reproduction over a long period of time even when used in the DC contact charging method. The present invention also provides a process cartridge and an electrophotographic apparatus which have such a charging member.

This application claims the benefit of Japanese Patent Application No. 2006-052849, filed Feb. 28, 2006, which is hereby incorporated by reference herein in its entirety.

The invention claimed is:

1. A process for producing a charging member comprising a support, a conductive elastic layer formed on the support and a surface layer formed on the conductive elastic layer, comprising the steps of:

(A) providing a condensation product having an epoxy group by hydrolyzing and condensing a hydrolyzable silane compound represented by the following formulae (2a) or (2b):

(2a)

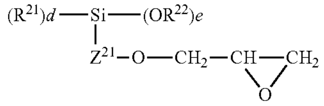

(2b)

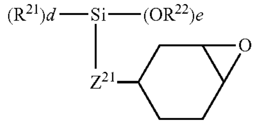

wherein $R^{21}$ and $R^{22}$ each independently represent an alkyl group having 1 to 3 carbon atoms; $Z^{21}$ represents an alkylene group having 1 to 6 carbon atoms; and d is an integer of 0 to 2, e is an integer of 1 to 3, and d+e is 3;

(B) providing a coating solution for the surface layer containing the condensation product and a compound represented by the following formula (3):

$$R^{31}—X—H \quad (3)$$

wherein X represents one functional group selected from the group consisting of —O—, —$NR^{32}$- and —COO—; $R^{31}$ represents an alkyl group having 5 to 30 carbon atoms; and $R^{32}$ represents a hydrogen atom; and (C) coating the surface of the conductive elastic layer with the coating solution, and then cleaving the epoxy group of the condensation product and reacting the condensation product and the compound represented by the formula (3) to form the surface layer on the conductive elastic layer.

2. The process according to claim 1, wherein the step (A) comprises:

providing a mixture of the hydrolyzable silane compound represented by the formulae (2a) or (2b) and a hydrolyzable silane compound represented by the following formula (4):

$$(R^{41})_a\text{-Si—}(OR^{42})_b \quad (4)$$

wherein $R^{41}$ represents an unsubstituted alkyl group having 1 to 21 carbon atoms or an alkyl group having 1 to 21 carbon atoms substituted with a phenyl group; $R^{42}$ represents an alkyl group having 1 to 3 carbon atoms; and a is an integer of 0 to 3, b is an integer of 1 to 4, and a +b =4; and hydrolyzing and condensing the hydrolyzable silane compounds to obtain the condensation product having an epoxy group.

* * * * *